(12) United States Patent
Johnson et al.

(10) Patent No.: US 7,499,991 B2
(45) Date of Patent: Mar. 3, 2009

(54) AUTONOMIC APPLICATION SERVER UNNEEDED PROCESS DISABLEMENT

(75) Inventors: Chris D. Johnson, Rochester, MN (US); Kristi Paula Peterson, Rochester, MN (US); John Joseph Stecher, Rochester, MN (US); James Lee Van Oosten, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 11/272,591

(22) Filed: Nov. 10, 2005

(65) Prior Publication Data

US 2007/0106772 A1    May 10, 2007

(51) Int. Cl.
*G06F 15/16* (2006.01)

(52) U.S. Cl. ................................ 709/223; 713/2

(58) Field of Classification Search .......... 709/200–202, 709/220–223; 711/103; 713/2
See application file for complete search history.

(56) References Cited

U.S. PATENT DOCUMENTS

2003/0135729 A1*  7/2003  Mason et al. ................. 713/2

* cited by examiner

*Primary Examiner*—Moustafa M Meky
(74) *Attorney, Agent, or Firm*—Dillon & Yudell LLP

(57) ABSTRACT

A method, system, and computer program product for enabling efficient start up of an application server with the components required for complete operation of the supported application. A pre-processor autonomically determines the specific services that are required by the application to be initiated within the application server during start up of the application. The specific services are selected from a comprehensive list of available services for start up of the application server. The application server is then started up with only the specific services required by the application, rather than the full list of services.

17 Claims, 2 Drawing Sheets

AUTONOMIC APPLICATION SERVER UNNEEDED PROCESS DISABLEMENT

BACKGROUND OF THE INVENTION

1. Technical Field

The present invention relates generally to computing devices and in particular to application servers. Still more particularly, the present invention relates to run-time start up processes for application servers.

2. Description of the Related Art

Application servers are software applications in an intranet/Internet environment that host a variety of language systems used to program database queries and/or perform general business processing. The application server may reside in the same computer as a Web server, i.e. a HyperText Transport Protocol (HTTP) server. In some distributed systems with large Web sites, a single system may be utilized as both an application server and a Web server. An example of this web application server, as such systems are called, is WebSphere Application Server. WebSphere is a registered trademark of International Business Machines (IBM) Corporation.

While Websphere Application Server (WAS) provides enhanced functionality for business and application processes, one notable limitation with conventional designs of WAS is that the start up time for a WAS is excessively long. This lengthy start up time is experienced because the application server is designed to always start a pre-set, substantially large number of components/services, regardless of whether or not the components are needed.

Conventional web application servers, e.g., WebSphere, are shipped with all of their respective large number of functions enabled. Thus, a customer who is running multiple J2EE applications on the same machine is provided a cluster of application servers that are installed in a generic manner to automatically initiate al of their components during start up. The vast number of components is, however, usually far beyond what a customer really needs for the particular application. Also, installation of this vast number of components results in a large memory footprint size and long startup times in a failover scenario. Customers, however, typically desire/need a faster startup process in production, test and development environments in order to save time and money.

Thus, several solutions have been proposed to reduce this long start up time for application servers. Among these proposed solutions are: (1) delaying startup of application server components or changing lines of code to be more efficient; and (2) enabling a user to disable some services manually if the user knows the services are not needed. With the former solution, services that are delayed take time starting later and even if code segments are more efficient, these delayed services still may take a relatively long time to start. None of these solutions completely address the needs of customers with different requirements for components within the WAS environment, which may support multiple different types of applications, each with a different startup requirement. A solution that may be universally applied and which does not suffer from the limitations of present proposed solutions would thus be a welcomed improvement.

SUMMARY OF THE INVENTION

Disclosed is a method, system, and computer program product for enabling efficient start up of an application server with the components required for complete operation of the application to be executed on the server. A pre-processor autonomically determines the specific services that are required (by the application) to be initiated within the application server during start up to support the application. The specific services are selected from a comprehensive list of available services for start up of the application server. The application server is then started up with only the specific services required by the application, rather than the full list of available services.

In one embodiment, the pre-processor parses the ear (enterprise archive) file of the application and generates a binary file with the list of services. Each of the specific services to be initiated during start up are tagged with an "on" indicator, while the other services each have an "off" indicator. When the application server goes through start up, only those services indicated as on are initiated/activated.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for enabling efficient start up of an application server with the components required for complete operation of an application being executed. A pre-processor autonomically determines the specific services that are required (by the application) to be initiated within the application server during start up to support the application. The specific services are selected from a comprehensive list of available services for start up of the application server. The application server is then started up with only the specific services required by the application, rather than the full list of available services.

In one embodiment, the pre-processor parses the ear (Enterprise Archive) file of the J2EE (Java platform Version 2 Enterprise Edition) application and generates a binary file with the list of services. Each of the specific services to be initiated during start up are tagged with an "on" indicator, while the other services each have an "off" indicator. In yet another embodiment, a user/administrator is able to later access the binary file and selectively tag services on/off. When the application server goes through start up, only those services indicated as on are initiated/activated.

Figure 1:
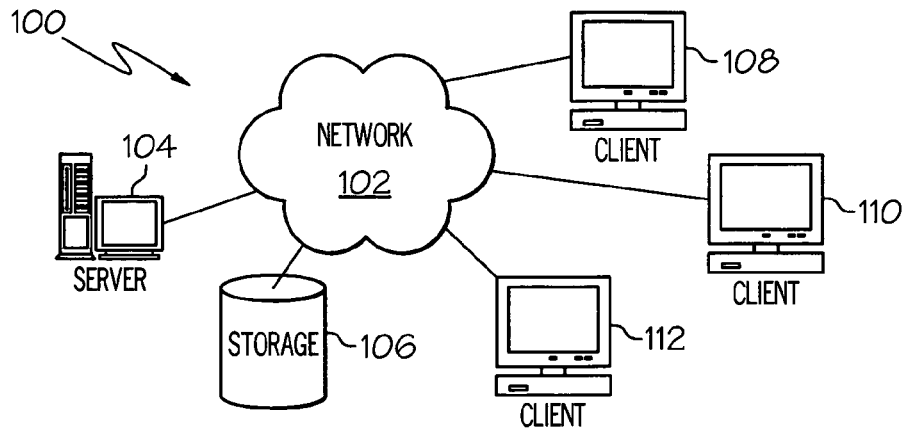
FIG. 1 is an exemplary diagram of a distributed network system having an application server in accordance with one embodiment of the present invention.

With reference now to the figures, FIG. 1 depicts a pictorial representation of a network of data processing systems (Network system 100) in which the present invention may be implemented. Network system 100 contains network 102

(also referred to as a network backbone/infrastructure), which is the medium utilized to provide communication links between various devices and computers connected together within network system 100. Network 102 may include connections, such as wire, wireless communication links, or fiber optic cables.

In the depicted example, network system 100 comprises server 104 and multiple clients 108, 110, and 112 connected to network 102. Server 104 is depicted along with an associated storage unit 106, which is also connected to network 102. Clients 108, 110, and 112 may be, for example, personal computers or network computers. In the depicted example, server 104 provides data, such as boot files, operating system images, and applications to clients 108, 110, 112. In the described embodiment, server 104 functions as an application server, such as WebSphere Application Server (WAS) available from International Business Machines Corporation. Network system 100 may include additional servers, clients, and other devices not shown.

In the described embodiment, network system 100 is the Internet with network 102 representing a worldwide collection of networks and gateways that utilize the Transmission Control Protocol/Internet Protocol (TCP/IP) suite of protocols to communicate with one another. Of course, network system 100 also may be implemented as a number of different types of networks, such as an intranet, a local area network (LAN), or a wide area network (WAN), for example. FIG. 1 is intended as an example, and not as an architectural limitation for the present invention.

Figure 2:
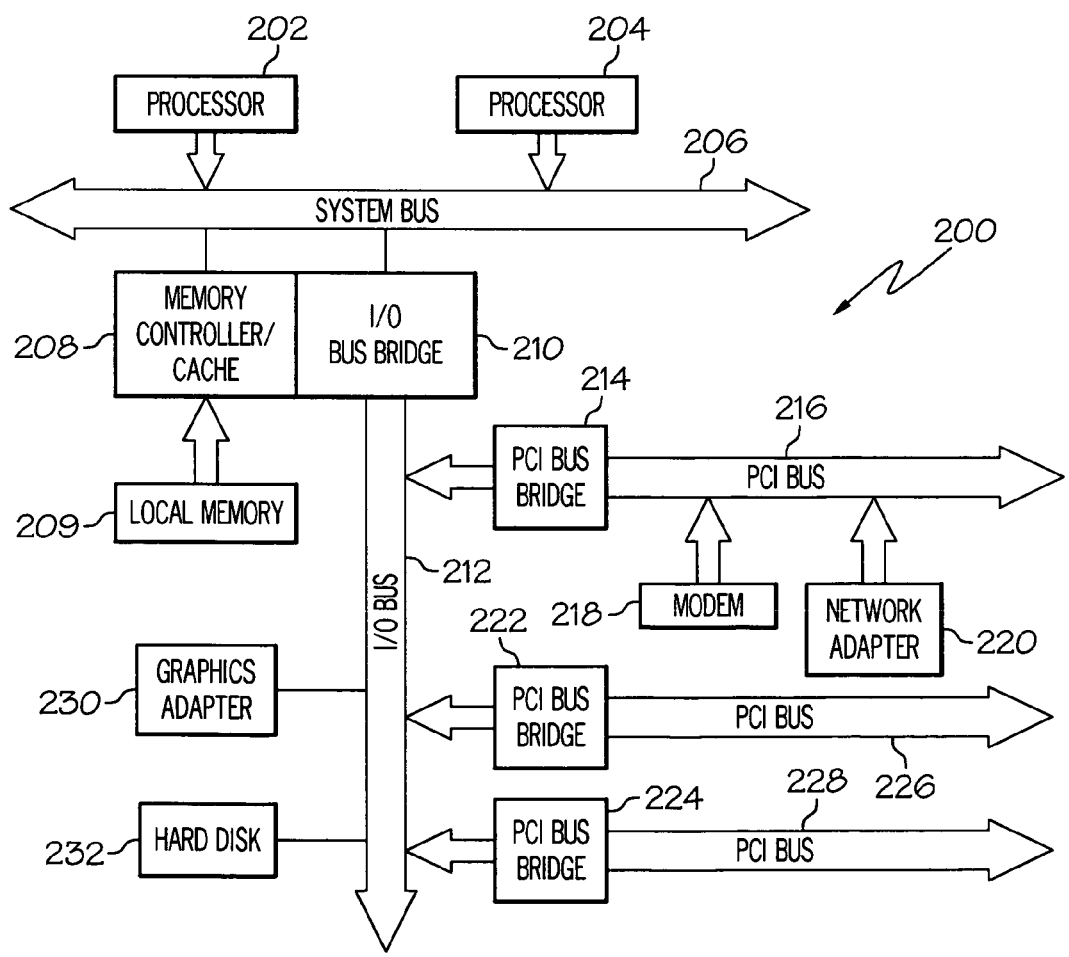
FIG. 2 is an exemplary block diagram of a data processing system utilized as an application server in accordance with one embodiment of the present invention.

Referring now to FIG. 2, there is depicted a block diagram representation of a data processing system that may be implemented as a server, such as application server 104 in FIG. 1, in accordance with the illustrative embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted (or not).

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108, 110, 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. Thus, the depicted example is not meant to imply architectural limitations with respect to the present invention. The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Notably, in addition to the above described hardware components of data processing system 200, various features of the invention are provided as software code stored within memory 209 or other storage and executed by processor(s) 202/204. Among the software code are code for providing application server functionality, code for enabling network connection and communication via modem 218 and/or network adapter 220, and more specific to the invention, code for enabling the pre-processor features and application server startup features described below. For simplicity, the collective body of code that enables the pre-processor features and application startup features are referred to herein as server application-specific startup (SASS) utility. In actual implementation, the SASS utility may be added to existing application server code to provide the enhanced startup functionality described below. SASS utility comprises a pre-processor function and a run-time startup process.

Depending on implementation, the pre-processor function may be provided/activated at application development or install time. When the user installs the J2EE application, the installation proceeds to deploy the application's enterprise java beans (ejb's), JSPs, and other components. Once the application deployment phase is complete, the pre-processor function automatically activates and first parses the deployment descriptors to see which services are enabled inside of the descriptors. Secondly, the pre-processor function introspects the actual application code, searching for services API's (application programming interfaces) that are being called in order to determine which services are being accessed by the application. During these two phases, which, in the described embodiment, are completed in parallel for enhanced performance metrics, a binary file is generated that includes a list of services the application server needs to start to support the application and allow the application to run properly. This binary file is added to the ear file and exploded on to the disk (storage memory component of the server) similar to the installation of a typical application. Then, during the run time startup process, the application server reads this binary file as part of the bootstrap process and determines which services are to be started up.

Figure 3:
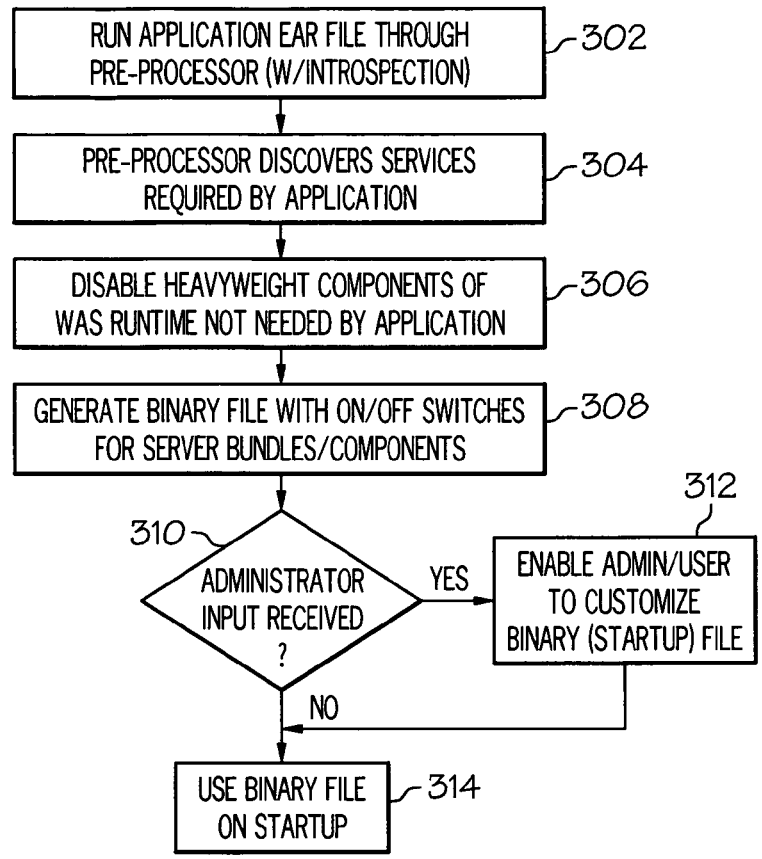
FIG. 3 is a flow chart illustrating the processes provided by the pre-process function according to one embodiment of the invention.

FIG. 3 illustrates the process steps completed by the above described pre-processor function, according to one embodiment. As shown by block 302, the ear file of the application is inputted to (or run through) the preprocessor function. The pre-processor function then utilizes a pre-programmed mechanism to discover the particular services that are required by the application, as depicted at block 304. In one embodiment, during the application deployment process, the application's ear file is provided to the pre-processor, which uses introspection to look at the code in the application and parse the deployment descriptors to determine which features of the application server need to be started to support the application running (i.e., to be executed) on the server. In one embodiment, the pre-processor function parses the ear file of the application for J2ee meta-data, J2EE annotations, reflection, and/or imports to discover what services are required by the J2EE application.

Returning to the FIG. 3, once the required services are discovered, the pre-processor function generates a binary file containing the list of all available services (components) of the application server, as stated in block 306. Within the binary file, those services that are identified as required for the application are tagged with an "on" indicator. The on indicator may be a simple logic high or binary 1 within an indicator field next to each service within the binary file. Other services that are not identified by the pre-processor function as required would then have an "off" indicator value (i.e., logic low or binary 0). Table A below illustrates an exemplary binary file of services/components (sequentially numbered 1 through N) and their corresponding indicator value. As illustrated by the table, Services 1, 2, an N are on, while services 3 and N-1 are off. The exact number of services and their respective indicator values may vary from one implementation to the next.

TABLE A

| Application Server Service/Component | Indicator Field |
|---|---|
| Service1 | 1 |
| Service2 | 1 |
| Service3 | 0 |
| . | . |
| . | . |
| . | . |
| ServiceN-1 | 0 |
| ServiceN | 1 |

Also, while shown as services, it is understood that the binary file created by the pre-processor function may comprise application server bundles or components, such as the EJB container and startup beans of a WAS.

By using introspection and simply looking at the deployment descriptors, the pre-processor is also able to disable heavy weight components of the WAS runtime that are not needed by the application to run, as indicated at block 306. Disabling these heavy weight components provides the application server's runtime a much smaller memory foot print (i.e., there are less classes and functions loaded into memory) as well as reducing the time required for the application server's startup (because of the smaller number of component initialization required). The binary file thus also indicates which components are identified as heavy weight components, as these components are disabled by placing a 0 value in their respective indicator field.

With conventional application server startup, every component (including the heavy weight components not required by the application) is initiated/activated because there is no method for determining which services the application being installed needs to function. Thus, in conventional application server or middleware space, all servers are started with most (or all) functions enabled, relying solely on settings provided by the administrators, who may choose to manually disable particular services. This conventional method makes it very difficult/troublesome to enable and/or disable the right services without a lot of communication between application developers and the server administrator. Additional overhead is therefore added to the development process as well as the administrative process as the server has to be manually configured for each application and for every change that is required to an application during development.

The described embodiment of the invention substantially eliminates all of the overhead associated with the install of a new application and start-up of the application server by automating the selection of relevant services during application installation onto the application server. Performing the service selection and configuring dynamically at installation time is superior in flexibility and usability to prior methods. Also, according to the invention, the pre-processor function supports any changes to the application as well because all applications running on an application server must be deployed and thus the application will always pass through the pre-processor, which will generate the application's specific startup file.

Returning again to FIG. 3, following the disabling of heavy weight components, a determination is made at block 310 whether administrative/user input as to which services should be turned on/off is received. Thus an administrator/user is able to customize the startup file and may do so via the administrative console in one embodiment or some other user interface in alternate embodiments. The user may include additional services or exclude ones that are unneeded or unwanted (such as deprecated application code, use during in test environment).

If there is no administrative input received, the autonomically-generated binary file is saved and later utilized during startup process (described below), as shown at block 314. However, when administrative input is received, the administrator is provided access to the binary file and may customize the binary file by selectively placing services in the off or on position for initiation during start up, as indicated at block 312.

Figure 4:
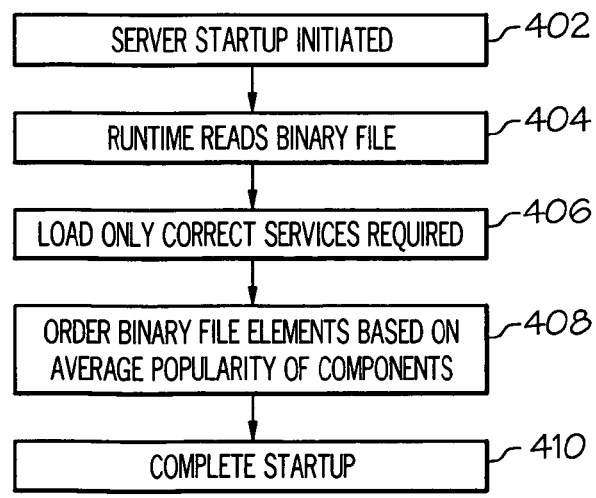
FIG. 4 is a flow chart of illustrating the start up process utilizing a binary file generated by the pre-process function of FIG. 3 according to one embodiment of the invention.

Turning now to FIG. 4, which illustrates a flow chart of the process of initiating startup of the application server utilizing the binary file generated by the pre-processor function, according to one embodiment. The process begins at block 402 at which the application server startup is initiated, and proceeds to block 404, which depicts the runtime process retrieving and reading the binary file generated by the pre-processor function. As indicated by block 406, the runtime process is pre-programmed to read the binary file and load only the correct services needed for the application. In the illustrative embodiment also, the components of the binary file that are selected to be loaded (i.e., those with an on indicator) are compared against historical metrics and sequentially ordered based on the average popularity of the components relative to each other, as indicated at block 408. Following this ordering of components, the startup process is undertaken for the application and completed in the time required for only those selected services to be initiated, as depicted at block 410.

Application of the features of the invention provides usability by a wide audience including new administrators, experienced administrators, testers and developers. For example, a new administrator is able to run an application and let the application server autonomically discover what components the application requires and only start the necessary components. The user is automatically saved start up time even without any administrative input. Additionally, a more experienced administrator may assert tighter control on what services/components are started and when they are started. The more experienced administrator utilizes the application server's discovery pre-processor function to generate the binary list and then adjusts/modifies the generated binary file, if necessary. Developers and testers will no longer rely on the heavy footprint of starting several unneeded service, but will rather be more productive as startup time for the application will be proportional to how much code has been implemented.

The solution provided by the described embodiment solves the long latency problem found with conventional startup processes by only starting the services/components actually needed by the application. This allows all required components to be readily available, while unneeded components are not started.

The invention may be implemented in large middleware farms that are often utilized by corporations for their IT backbone. Implementation of the invention results in the overall system footprint of application servers, such as WebSphere, smaller based on the specific application(s) being installed. In one embodiment, an (already built) pre-processor is utilized on the ear file when the user installs the ear file. The pre-processor determines what interfaces and in turn what components of the server the application will need to use and then the pre-processor cross references these components with the other applications installed on the server. The pre-processor then only starts up the joint set of services needed by the applications on that specific server. The pre-processor thus interacts with the application server runtime to ensure that only needed components are started and eliminates dynamic compilation and other overheads found with conventional approaches. By using the described features of the invention, the user is provided much more flexibility for the user's current hardware setup and also allows dynamic application changes to occur which will startup new components on demand if needed or disable them if removed.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In an application server environment, a method comprising:
   from a comprehensive list of available services for start up of the application server, autonomically determining which specific services are required by the application to be initiated within the application server environment during start up, wherein said autonomically determining further comprise parsing an ear file of the application through a pre-processor which provides introspection of the ear file to complete a discovery of the specific services associated with the application;
   generating a binary file having an on indicator for each of said specific services and an off indicator for other services among the list of services that are not determined to be a specific service; and
   dynamically enabling start up of the application server with only those specific services required by the application and which have an on indicator.

2. The method of claim 1, further comprising disabling components of the application server that are not needed by the application, wherein said dynamically enabling does not initiate the disabled components during start up of the application server.

3. The method of claim 1, wherein said dynamically enabling comprises referencing said binary file to initiate startup of the application server with only those services having an on indicator within the binary file.

4. The method of claim 1, further comprising enabling user selection of services among the list of services to include and exclude from the pre-determined specific services.

5. The method of claim 1, further comprising:
   determining a popularity of use for each of the specific services relative to each other; and
   ordering corresponding binary file elements associated with said specific services based on average popularity of the specific services, wherein a more popular service is given higher priority to initiate during start up before a less popular service.

6. A computer program product comprising:
   a computer readable medium; and
   program code on said computer readable medium for:
      from a comprehensive list of available services for start up of an application server, autonomically determining which specific services are required by the application to be initiated within the application server environment during start up; and
      enabling user selection of services among the list of services to include and exclude from pre-determined specific services;
      dynamically enabling start up of the application server with only those specific services required by the application and those services selected from the list of services to include.

7. The computer program product of claim 6, further comprising program code for disabling components of the application server that are not needed by the application, wherein said dynamically enabling does not initiate the disabled components during start up of the application server.

8. The computer program product of claim 6, wherein said program code for autonomically determining further comprise code for parsing an ear file of the application through a pre-processor which provides introspection of the ear file to complete a discovery of the specific services associated with the application.

9. The computer program product of claim 6, further comprising program code for generating a binary file having an on indicator for each of said specific services and an off indicator for other services among the list of services that are not determined to be a specific service.

10. The computer program product of claim 9, wherein said program code for dynamically enabling comprises code for referencing said binary file to initiate startup of the application server with only those services having an on indicator within the binary file.

11. The computer program product of claim 9, further comprising program code for:
   determining a popularity of use for each of the specific services relative to each other; and
   ordering corresponding binary file elements associated with said specific services based on average popularity of the specific services, wherein a more popular service is given higher priority to initiate during start up before a less popular service.

12. A data processing system comprising:
   a processor;
   a memory coupled to the processor and which comprises program code that when executed by the processor provides the functions of:
   enabling an application server functionality comprising multiple available services to support a particular application being provided by the application server;
   from a comprehensive list of available services for start up of the application server:

autonomically determining which specific services are required by the application to be initiated within the application server environment during start up; and generating a binary file having an on indicator for each of said specific services and an off indicator for other services among the list of services that are not determined to be a specific service; and dynamically enabling start up of the application server with only those specific services required by the application and which have an on indicator.

13. The data processing system of claim 12, said program code further comprising code for disabling components of the application server that are not needed by the application, wherein said code for dynamically enabling does not initiate the disabled components during start up of the application server.

14. The data processing system of claim 12, wherein said program code for autonomically determining further comprise code for:

parsing an ear file of the application through a pre-processor which provides introspection of the ear file to complete a discovery of the specific services associated with the application.

15. The data processing system of claim 12, wherein said program code for dynamically enabling comprises code for referencing said binary file to initiate startup of the application server with only those services having an on indicator within the binary file.

16. The data processing system of claim 12, said program code further comprising code for enabling user selection of services among the list of services to include and exclude from the pre-determined specific services.

17. The data processing system of claim 12, said program code further comprising code for:

determining a popularity of use for each of the specific services relative to each other; and ordering corresponding binary file elements associated with said specific services based on average popularity of the specific services, wherein a more popular service is given higher priority to initiate during start up before a less popular service.

\* \* \* \* \*